United States Patent
Sosonkin et al.

(10) Patent No.: US 9,723,489 B1
(45) Date of Patent: Aug. 1, 2017

(54) AUTOMATED VULNERABILITY DISCOVERY IN MOBILE DEVICE APPLICATIONS

(71) Applicant: Synack, Inc., Redwood City, CA (US)

(72) Inventors: Mikhail Sosonkin, Redwood City, CA (US); Mark Kuhr, Redwood City, CA (US)

(73) Assignee: SYNACK, INC., Redwood City, CA (US)

( * ) Notice: Subject to any disclaimer, the term of this patent is extended or adjusted under 35 U.S.C. 154(b) by 0 days.

(21) Appl. No.: 15/132,819

(22) Filed: Apr. 19, 2016

(51) Int. Cl.
*H04W 24/00* (2009.01)
*H04W 12/10* (2009.01)
*H04W 24/04* (2009.01)
*H04W 24/08* (2009.01)

(52) U.S. Cl.
CPC ........... *H04W 12/10* (2013.01); *H04W 24/04* (2013.01); *H04W 24/08* (2013.01)

(58) Field of Classification Search
CPC ...... H04W 12/10; H04W 24/04; H04W 24/08
USPC ..................................... 455/423, 425, 550.1
See application file for complete search history.

(56) References Cited

U.S. PATENT DOCUMENTS

| | | | | |
|---|---|---|---|---|
| 7,433,304 B1* | 10/2008 | Galloway | ........... | H04L 12/5695 370/229 |
| 7,779,369 B1* | 8/2010 | Dassow | ................ | G06F 9/4443 715/781 |
| 9,195,809 B1 | 11/2015 | Kaplan et al. | | |
| 2005/0005169 A1* | 1/2005 | Kelekar | .............. | H04L 63/1408 726/4 |
| 2007/0083933 A1* | 4/2007 | Venkatapathy | ....... | G06F 21/577 726/25 |
| 2011/0126202 A1* | 5/2011 | Krauss | ................... | G06F 9/485 718/102 |
| 2013/0014093 A1* | 1/2013 | Lee | ..................... | G06F 11/3604 717/142 |
| 2017/0075795 A1* | 3/2017 | Sinha | ................. | G06F 11/3676 |

OTHER PUBLICATIONS

"Apple Instruments User Guide," Apple, Sep. 13, 2016 [retrieved Jan. 3, 2017], 251 pages, https://developer.apple.com/library/content/documentation/DeveloperTools/Conceptual/InstrumentsUserGuide/index.html#//apple_ref/doc/uid/TP40004652.

(Continued)

*Primary Examiner* — Khai M Nguyen
(74) *Attorney, Agent, or Firm* — Davis Wright Tremaine LLP; Philip H. Albert

(57) ABSTRACT

A testing system tests applications executable on a computing platform, when the app under test executes on the computing platform, the app program code refers to a tree data structure for its user interface operations. That tree data structure is accessed without needing to interrupt the app under test or without needing software hooks into the app. The testing system obtains a specification of user interface criteria from an operator, processes the tree data structure with the specification to identify nodes of the tree data structure that match the user interface criteria, and outputs a representation of the matching nodes. The matching nodes are user interface entry points capable of being used to test the app for vulnerabilities. The specification can include edge criteria, wherein an edge criterion corresponds to a characteristic of an edge in the tree data structure between at least two nodes of the tree data structure.

11 Claims, 6 Drawing Sheets

(56) References Cited

OTHER PUBLICATIONS

"PhantomJS," Wikipedia the Free Encyclopedia, Sep. 10, 2016 [retrieved Dec. 30, 2016], four pages, https://en.wikipedia.org/wiki/PhantomJS.

"The Mobile Top Ten," OWASP, Feb. 26, 2016 [retrieved Dec. 30, 2016], three pages, https://www.owasp.org/index.php/Mobile_Top_10_2016-Top_10.

Freeman, "Cycript Manual," Cycript, copyright 2014-2016 [retrieved Dec. 30, 2016], 32 pages, http://www.cycript.org/manual/.

\* cited by examiner

```
@"<UIWindow: 0x145620f0; frame = (0 0; 320 568); gestureRecognizers = <NSArray: 0x170053560>;
                layer = <UIWindowLayer: 0x170033de0>>
 | <UIView: 0x14552a690; frame = (0 0; 320 568); autoresize = W+H;
                    layer = <CALayer: 0x174037d80>>
 |   | <_UILayoutGuide: 0x14553cdf0; frame = (0 0; 0 20); hidden = YES;
                         layer = <CALayer: 0x17403fac0>>
 |   | <_UILayoutGuide: 0x14553d280; frame = (0 568; 0 0); hidden = YES;
                         layer = <CALayer: 0x17422ac60>>
 |   | <UITableView: 0x145858e00; frame = (0 0; 320 568); clipsToBounds = YES; opaque = NO;
                     autoresize = W+H;
                     gestureRecognizers = <NSArray: 0x170241500>;
                     layer = <CALayer: 0x17003df20>;
                     contentOffset: {0, 0}; contentSize: {320, 867.5}>
 |   |   | <UITableViewWrapperView: 0x145638c30; frame = (0 0; 320 568);
                                    gestureRecognizers = <NSArray: 0x1702418c0>;
                                    layer = <CALayer: 0x17003fbe0>;
                                    contentOffset: {0, 0}; contentSize: {320, 568}>
 |   |   |   | <UITableViewCell: 0x145634f00; frame = (0 553.5; 320 44);
                                 text = 'Transport Layer Security'; autoresize = W;
                                 layer = <CALayer: 0x17003d6c0>>
 |   |   |   |   | <UITableViewCellContentView: 0x145635250; frame = (0 0; 286 44);
                                                opaque = NO; gestureRecognizers = <NSArray: 0x174249e10>;
                                                layer = <CALayer: 0x17003d660>>
 |   |   |   |   |   | <UITableViewLabel: 0x145635370; frame = (16 0; 269 44);
                                           text = 'Transport Layer Security'; clipsToBounds = YES;
                                           opaque = NO; layer = <_UILabelLayer: 0x170099e60>>
```

FIG. 2

AUTOMATED VULNERABILITY DISCOVERY IN MOBILE DEVICE APPLICATIONS

FIELD OF THE INVENTION

The present disclosure generally relates to testing of computers, devices and computer systems relating to security issues. The disclosure relates more particularly to techniques for performing automated discovery of vulnerabilities in applications running on mobile devices or other reduced-functionality computing devices.

BACKGROUND

Performing security testing on a computer system might involve exercising parts of the functionality of the computer system and evaluating whether an instance of security vulnerability exists. For example, if a computer system is supposed to be accessible only to authorized persons and is supposed to block unauthorized persons, a simple test might be for a tester to access the computer system and at a login screen that asks for a user name and a password, type in a known invalid name, such as "nobody" and a known invalid password such as leaving the password field blank and then submitting that as a login. If the computer system responds by allowing the tester past the login screen as if the tester were an authorized person, that indicates that the computer system has a security vulnerability. If the computer system responds by displaying a message such as "Unrecognized user name or password" and remains at the login screen, that may indicate that the computer system might not have that particular vulnerability.

Some security testing might be done manually, wherein a human tester tries to execute a few operations known to expose common vulnerabilities and then explores different attack vectors to identify more subtle vulnerabilities. This can involve considerable amount of effort and can be more difficult if not all aspects of the system under test are accessible.

For a mobile application (a program designed to run on a mobile device or other reduced-functionality device, such as a smartphone, tablet, smartwatch, etc., or designed to run in a simplified environment rather than a general purpose computing system; often referred to as an "app"), its vulnerabilities might be discovered through manual analysis of the source code of the app or of the executable binary code of the app. Both approaches have advantages, the latter case being the most desirable for detecting vulnerabilities in the product that the user sees. However, analysis of the binary code presents many difficulties for the analyst, in part because the binary code lacks information for understanding the semantics of the app's logic and the hooks needed to trigger functionality for automation of vulnerability scanning.

One approach for automated vulnerability scanning is static testing, wherein a testing system or program reads the binary code and looks for patterns known to be associated with vulnerabilities. Another approach is dynamic analysis, where the app is executed on a suitable platform and an analyst examines the external response of the app to inputs (e.g., the app's outputs, the network traffic, file input/output, etc.) and/or internal behavior (e.g., code injection, uncleared sensitive data, etc.) and deduces vulnerabilities from that behavior. Hybrid approaches are also possible, such as static testing with limited emulation of subcomponents. In any case, an automated system or analyst is limited to derivation of what the binary code is expected to do.

Semi-automated or fully-automated tools to perform static/dynamic testing might be driven by an analyst's intuition, but what often happens is that the tools are either too specific in their vulnerability signature or output too many false positives. In either case, the analyst potentially ends up with more work than initially expected.

SUMMARY

In an embodiment of a testing system, for testing applications executable on a computing platform, when the app under test executes on the computing platform, the app program code refers to a tree data structure for its user interface operations. That tree data structure is accessed by the testing system, without needing to interrupt the app under test and without needing software hooks into the app or needing to modify the app's operation from the perspective of a user of the app. The testing system accesses the tree data structure, obtains a specification of user interface criteria from an operator, processes the tree data structure with the specification to identify nodes of the tree data structure that match the user interface criteria, and outputs a representation of the one or more matching nodes.

The app under test can be tested using the one or more matching nodes, as they are user interface entry points capable of being used to test the app for vulnerabilities. The specification can include edge criteria, wherein an edge criterion corresponds to a characteristic of an edge in the tree data structure between at least two nodes of the tree data structure.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 2 illustrates an example of part of a tree data structure corresponding to part of a user interface tree for an app.

Figure 1:
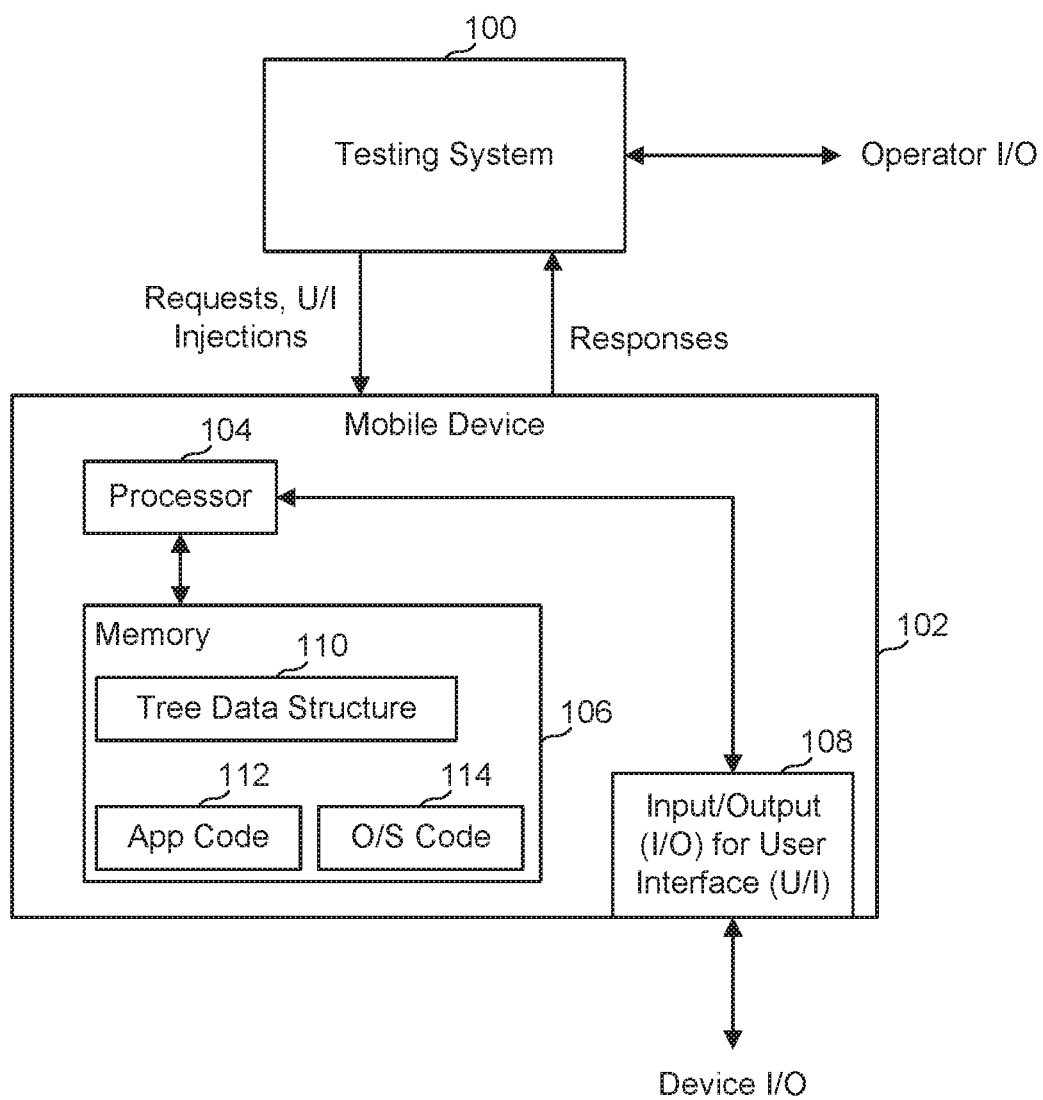
FIG. 1 illustrates a test environment wherein a testing system, based on operator interaction, can test a mobile device.

Appendix A (Lexicon for Automated Vulnerability Discovery Language) and Appendix B (Language Grammar for Automated Vulnerability Discovery) are included herewith comprising source code examples.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In many of the examples in this disclosure, a computer system being evaluated in a security test is software being executed by one or more processor and hardware comprising the one or more processor, associated memory, network connections, interfaces and the like. Such a computer system might comprise multiple elements, such as multiple computer servers, multiple database servers, network equipment that facilitates data communications between multiple elements and users of the computer system, multiple processors and program instruction storage devices that contain program code corresponding to one or more application programs (applications) that are executed by the computer system. For simplicity in the explanations here, testers are people or other computer systems that test the computer system by interacting with an application that is executed by the computer system.

As described herein, a mobile application (a program designed to run on a mobile device or other reduced-functionality device, such as a smartphone, tablet, smartwatch, etc., or designed to run in a simplified environment rather than a general purpose computing system; often referred to as an "app") is to be tested to determine its vulnerabilities to security attacks or other vulnerabilities.

The app might be structured as a tree of graphical user interface components and when executing, the app is represented as a tree data structure in an app process memory, wherein nodes and leaves of the tree data structure contain information that is accumulated as the app user works their way toward a leaf. This information can be used by the automated test system described herein to reconstruct the visual representation of the app, such as buttons, text boxes and other similar components recognizable by the user. As used herein, the term "user" refers to the person (or computer element, in some cases, but usually a person) to whom the output of the app is directed during normal operation and from whom input for the app is expected. As used herein, an "analyst" is a person or automated program or system that "stands in" as the user for the purpose of testing.

For example, consider a calendaring app that is written to execute on a particular mobile platform (such as the iOS™ operating system, the Andriod™ operating system, or the like), and that is programmed to allow users with some credentials to modify calendar entries while users with other credentials are not supposed to be able to modify calendar entries. A person using the smartphone, tablet, computer device, wearable device, etc. that runs that particular mobile platform and that app on that platform could be a user or an analyst. It should be noted that, from the point of view of the app, a user and an analyst might be indistinguishable. For example, a user might attempt to change a calendar entry that is not supposed to be modifiable by those having that user's credentials, with the motivation being to have a changed calendar entry, whereas an analyst might attempt to change the calendar entry with the motivation being to determine whether it is possible to change that calendar entry. In this manner, the analyst behaves as a user might, but with a different intent. For readability, in some parts of the description herein, the analyst might be referred to as a user, with the understanding that sometimes the analyst is emulating behavior of a user and at other times the distinction does not matter.

Where it might matter, is where an analyst, automated or otherwise, desires to obtain and manipulate components that the user sees. This is often a challenge as the tree data structure is optimized and meant for construction of a user interface rather than analysis of that user interface. This might not be significant where the app has a simple interface, such as where the app is a calculator with a single set of buttons that the user can press and a single display for a value. More typically, an app will have a large number of components, complex interconnections and many permutations of component properties. The complexity of the inputs can cause exponential growth in computing required to find vulnerable combinations.

An analyst can explore all of the combinations, to triggering the app's various features. Each time a feature is triggered, there is a potential of discovering an error condition. However, going through the various parts of the application is a laborious and time intensive due to the user interface manipulation required and other in-app delays. A simple interface might have as many as a dozen levels in a tree containing hundreds of different components. For example, to test a modification of a calendar entry might require selection of the app's icon, selecting a user, selecting among calendars, choosing a month, waiting for the display of that month, zooming down to a specific date, opening a calendar edit page, etc.

The analyst might be able to access the app's tree data structure and print the entire tree and look for a desired component, but the component might be missing. Using these methods the analyst would not be able to easily select components based on properties that are not selected for printing or return values of functions. These processes often obtain fairly mundane objects are time wasteful and uninspiring.

The analyst might accelerate testing by using an I/O simulator that simulates user touch, swiping, inputs, etc. Typically an I/O simulator requires access to source code and the ability to recompile the app, which limits who the analysts can be. Also, the I/O simulator approach may miss components that are not strictly under the realm of the app, such as those supplied by auxiliary code or an operating system. These can be used, but they often need to be supplemented by a testing system with more functionality.

Another approach is to emulate a browser environment using a standard library, for analyzing web-based operations. While useful for web testing, because of fundamental access to source code, this method does not work for testing against binaries. This might limit testing, for example where apps may contain components that are invisible to the user yet they are still in the internal representation.

Additional details for particular embodiments of an automated vulnerability discovery system and methods are described below with reference to the figures.

FIG. 1 illustrates a test environment wherein a testing system 100, based on operator I/O, can test a mobile device 102. As illustrated, mobile device 102 can include a processor 104, a memory 106, and an I/O interface 108, with memory 106 including a tree data structure 110, app code 112 and operating system (O/S) code 114. Processor 104 can read and write from memory locations in memory 106, including reading instructions that processor 104 then executes. Examples of processor instructions that processor 104 can execute includes app code 112 and O/S code 114. Memory 106 might comprise multiple different types of memory, the exact details of which are not essential to understanding this disclosure.

In a typical operation, mobile device 102 receives an input from a user (or a tester of the mobile device acting as a user would) while processor 104 is running O/S code 114. O/S code 114 includes instructions to load, upon the appropriate input such as a user pressing an icon, app code 112 and execute it. Examples of O/S code include the iOS operating system and the Android operating system. As part of the loading of app code 112, the O/S builds a tree data structure, stored as tree data structure 110, corresponding to a user interface tree for the application.

In the user interface tree for an app, there are nodes and edges. A node of the user interface tree corresponds to, and represents, a state of the app, while an edge corresponds to, and represents, a possible transition from one node to another node. A path taken among the nodes is defined by what user interaction is received and transition details for edges of the user interface tree. For example, a main menu node might have multiple edges where the particular edge taken depends on which menu item the user selected with the user interface.

FIG. 2 illustrates an example of part of a tree data structure corresponding to part of a user interface tree for an app. By navigating this tree data structure, a testing system can determine where possible vulnerabilities might need to be tested for and can set an app's state to a particular node of the tree data structure to perform testing. The snipped in FIG. 2 is the top of the tree from a sample app. In the example shown, the UIView element under the UIWindow element contains three children. The subcomponents represent children of components along with their visual properties. The classnames, properties and tree structure can be used as part of a query to select just the desired elements.

Security vulnerability testing can be difficult when source code is not available for static analysis or for guiding a security scan. Also, when the source code is not available, instrumenting an app with diagnostic hooks is not really possible. Security testers are not typically afforded the opportunity to request that app developers provide a special build of the app. In any case, testing the same end product that other users use is more accurate a test. As explained herein, security vulnerability testing can be done from the running app, where a tree data structure built by a graphical subsystem corresponding to user interactions is available. In such cases, a testing system obtains the tree data structure representing the user interface (UI) tree of the app, allows an operator to specify structured queries over the tree data structure to locate nodes of interest in the tree data structure so that the testing system can inject user interface interactions as part of a test of the app, natively address components of the app that are displayed to the user, and specify scan processes depending on the need and concisely describe UI processing.

Figure 3:
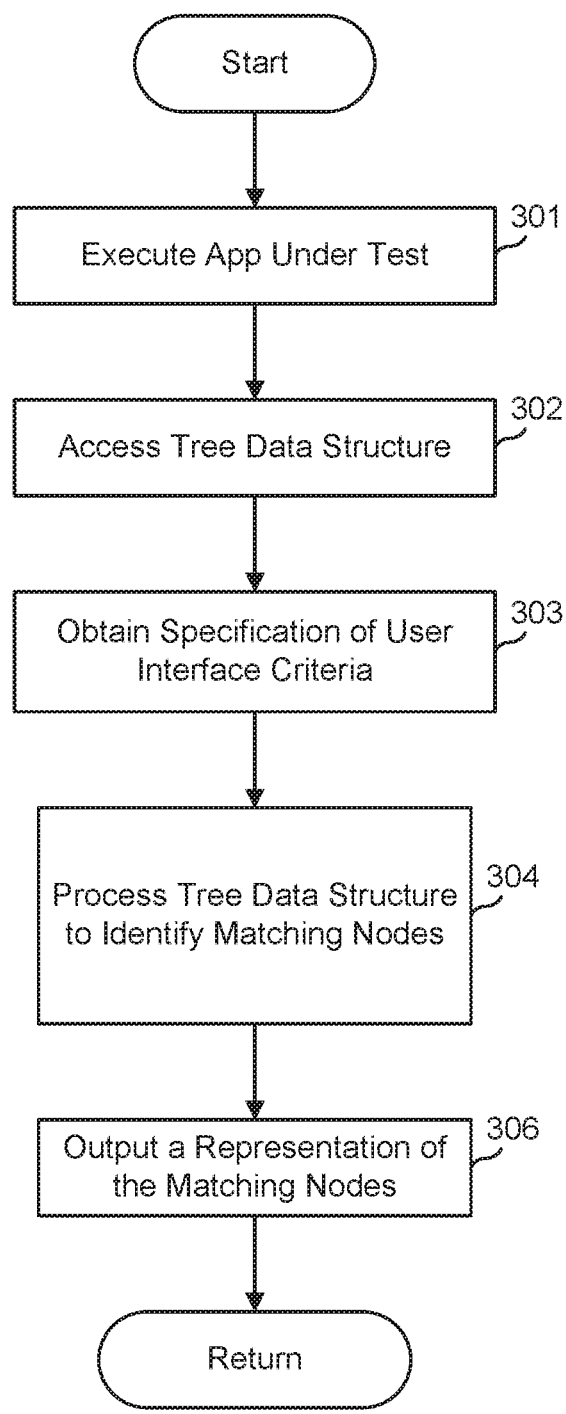
FIG. 3 is a flowchart of an automated testing.

FIG. 3 is a flowchart of an automated testing. This process might be executed by the testing system 100 of FIG. 1. In step 301, an app to be under test is executed. This causes a tree data structure to be created in memory. In step 302, the testing system accesses the tree data structure. At step 303, the testing system obtains a specification of a user interface criteria, such as the queries described herein. At step 304, the testing system walks the tree data structure, or otherwise processes the tree data structure, to identify nodes that match the specified criterion or criteria. At step 305, a representation of those matching nodes is output, possibly to an operator interface used by a testing analyst.

The testing analyst can use the testing system to query the UI tree to obtain the exact component or a set of components that matching a criteria specified by the analyst. This is specifically aimed at analysis of the UI tree. A domain specific language (DSL) can be used, as described herein, to select components based on existence of function/field or return values of those components. The testing system might walk the tree, using a depth-first search, to check components for eligibility (i.e., matching of the criteria). The DSL would also allow for additional criteria and walking other types of data structures. For example, the analyst can specify modifiers to request scanning up the tree with different selection criteria, such as requiring that all up-tree nodes match, none of the up-tree nodes match, at least one of the up-tree nodes matches, exactly one of the up-tree nodes matches, etc.

Technical Examples

Consider the case where a command line is used to process queries and provide results about the user interface tree. An example query (the same query might be applied to an API rather than a command line) might be "cy# [AMQuery q: "UIResponder UISearchBar"]" indicating that the tree data is being queried for a node that corresponds to a component named "UIResponder" or one named "UISearchBar". The corresponding AMQuery Objective-C function might be:

```
@interface AMQuery : NSObject {
}
+(NSArray*)q:(NSString*)query root:(UIView*)root;
+(NSArray*)q:(NSString*)query roots:(NSArray*)roots;
+(NSArray*)q:(NSString*)query;
@end
```

The response indicates how to call directly to that component and how to deal with it. The response can be formulated as an array that matches components. A possible response to the query by the testing system might be:

```
@[ #"<IMSearchBar: 0x17d1aa20;
    baseClass = UISearchBar;
    frame = (0 8; 304 29); text = ' ';
    opaque = NO;
    autoresize = W;
    gestureRecognizers = <NSArray: 0x17d1b1f0>;
    layer = <CALayer: 0x17d1ac30 >>"]
```

In a general case, the queries can be built up of different criteria that can be evaluated. A specification record for a criterion to be matched can comprise a class name (e.g., _class_==UIButtonLabel,_class_==UIImageView, etc.) and/or an attribute (such as those specification record examples listed in Table 1) that can be matched to a node of the tree data structure and returns an indicator of the existence of a node with the attribute or returns a value of a method call on the component.

TABLE 1

| Query | Meaning |
| --- | --- |
| [comp-name != 'Submit'] | calls the component [comp-name] and compares the return value against the string "Submit" |
| [comp-name *= c'Submit'] | calls the component [comp-name] and compares the return value against the string "Submit" with case insensitivity |
| [comp-name] | matches a component if it has the [comp-name] method |
| [isHidden ?true] | interprets the return value as BOOL and compares |

TABLE 1-continued

| Query | Meaning |
|---|---|
| _OR_List | Uses the same list of criteria but selects the component as an OR expression |

As an example, the query "UIButton [text]" would match a component that is a button or that has the 'text' attribute. For the _attribute_ indication, string literals can be either case sensitive or insensitive; the 'c' qualifier, as in the second example of Table 1, before the single quoted string would indicate case insensitivity. A specification record might use one or more of the attribute comparison operators listed in Table 2.

TABLE 2

| Operator | Meaning |
|---|---|
| '*=' | First argument contains the string represented by the second argument |
| '==' | First argument equals the string represented by the second argument |
| '!=' | First argument does not equal the string represented by the second argument |
| '$=' | First argument ends with the string represented by the second argument |
| '^=' | First argument begins with the string represented by the second argument |
| '?true' | The boolean value of the first argument is true |
| '?false' | The boolean value of the first argument is false |

By default, the testing system, given a query, walks the tree data from the root down. However, the testing system can be instructed in certain instances to select items from a supplied set (i.e., find result that match a selection criterion) or select items based on properties up the tree. Examples of such modifiers are shown in Table 3. The modifiers appear in the specification record before the selection criteria and they only affect the criterion immediately after the modifier.

TABLE 3

| Operator | Meaning |
|---|---|
| :OneUpTree | Selects the item if only one item in its ancestry tree matches the criteria |
| :AnyUpTree | Selects the item if at least one item in its ancestry tree matches the criteria |
| :AllUpTree | Selects the item if all items in its ancestry tree match the criteria |
| :OneDownTree | Selects the item if only one item in its tree descendants matches the criteria |
| :AnyDownTree | Selects the item if at least one item in its tree descendants matches the criteria |
| :AllDownTree | Selects the item if all items in its tree descendants match the criteria |
| :SetMode | Treats the input as a set (as opposed to tree roots) |

For example, a specification record ":SetMode [isSecureTextEntry ?true]" when submitted would result in the selection of tree nodes that have a secure field that set to true from the set supplied as roots. Based on these modifiers, an analyst can choose a searching algorithm. For example, those with postfix 'DownTree' use the recursive Depth First Search (DFS) algorithm represented by the following code:

```
void _walkViewTree(UIView* root, BOOL (^callback)
(UIView * curView)) {
  NSArray * subviews = [root subviews];
  for(UIView * view in subviews) {
    if(callback(view)) {
      _walkViewTree(view, callback);
    }
  }
}
```

DFS is the default searching algorithm if no modifier is specified. For modifiers with the 'UpTree' postfix, the parent search algorithm is selected, as in the example below:

```
void _walkViewTree(UIView* root, BOOL (^callback)
(UIView * curView)) {
  if(leaf == NULL) {
    return;
  }
  if(callback(leaf)) {
    _walkupView(leave superview, callback);
  }
}
```

The above is a recursive algorithm that checks the criteria based on the parent view of its subject. Specifying the set mode modifier will use a simple one level scan of the input array, simply selecting the components that match the criterion without walking up or down the tree. An example is:

```
void setWalk(NSArray* roots) {
  // One level deep, just the root.
  for(UIView* root in roots) {
    callback (root);
  }
}
```

The functions setWalk( ) and walkUpView( ) can be executed from one of the methods specified in AMQuery. Depending on the modifiers within the query, either walkUpView( ) or setWalk( ) are executed by the selection function. For example, if the selection functions :OneUpTree, :AnyUpTree, or :AllUpTree are specified, then WalkUpView( ) is executed. If the :setMode modifier is specified, SetWalk( ) is executed. The functions might be stored in a file called "uiquery.m" that is then compiled and injected into the target app. An example control flow might looks as follows:

```
+ (NSArray*)q:(NSString*)query roots: (NSArray*)roots
    User initiates a query via AMQuery class
    -> parse_query
         System parses the query string
         -> process_ast_attr
              The abstract tree is interpreted
              -> WalkUpView
                   Query is executed. This is a recursive step.
```

Using these specification records, an analyst can mix and match criteria and scanning to choose or identify a desired component. For example, the analyst might want to find a button that is not hidden from the user and can easily issue an appropriate query instead of having to look through all the available buttons to find one that is not part of a hidden ancestor component.

A more complete specification of the lexicon is provided in Appendix A. A more complete specification of the language grammar is provided in Appendix B.

Further Examples

Example 1: An Automation System for Navigating a Login Screen

The testing system could automate navigating to a login screen for an app. This might enable the testing system to perform authenticated vulnerability scanning of apps. An example specification of a login screen would be the following:

```
// This function returns true if the view is deemed a login screen.
BOOL isLoginScreen(UIView* view) {
    return
        // First requirement: that there is only one password field
        [[AMQuery q: @"UITextField :AllUpTree [isHidden ?false]
            UITextField :SetMode [isSecureTextEntry
        ?true]"
            root:view] count] == 1 &&
        // Second requirement: that there is only one regular field
        [[AMQuery q: @ "UITextField :AllUpTree [isHidden ?false]
            UITextField :SetMode [isSecureTextEntry
        ?false]"
            root:view] count] == 1 &&
        // Third requirement: that there is at least one button
        [[AMQuery q: @"UIButton :AllUpTree [isHidden ?false]
        UIButton"
            root:view]count]> 0;
    }
```

Using these specification records, a testing system can easily perform tasks that might otherwise be tedious. Each of the selection queries is part of a complex boolean expression that, if evaluated to true, would mean that the view in question is actually a login screen, or at least deemed to be so by the testing system, which would conclude that it is a login screen because there is a password field, there is only one password field, there is a regular field, there is only one regular field, and there is at least one button.

Using these techniques, the analyst can choose a scanning algorithm from within the query using the criterion modifier, such as the ":SetMode" modifier. The native feel to the queries can assist analysts. The analyst is not required to think about the specifics of the underlying data structure or the component properties, but just says what they want to choose, such as querying for "isHidden is false" instead of searching for an object whose implementing class is a UITextField that has a field isHidden whose value is false.

Example 2: Locating Touchable Components

Suppose the analyst wanted to find and test UI components that can be touched on the mobile device screen by the human user. Those components may come in many flavors and the specification record language allows the analyst to select them without having to think about the underlying scanning mechanism. One example is:

```
NSArray* touchables =
[AMQuery q: @"(_UIAlertControllerActionView BKToolbarButton
        UITabBarButton _UIModalItemTableViewCell
    UITableViewCell
        UIButton UISegmentLabel UIButtonLabel)"
    root:view];
```

The query presented above will select items whose class name matches one of the names in the list. The analyst simply has to know what they need. This code might be injected into the apps' running process and execute without perturbing other target systems.

Example 3: Keyboard Input Elements

An analyst might want to obtain an array of all elements that allow for keyboard entry, as might be done if the analyst is running a fuzzing scan, using the "keyboardType" element. An example query is:

NSArray* inputs=[AMQuery q:@"[keyboardType]" root:view];

For that query, the returned array comprises all components that allow keyboard input. This array can then be used programmatically for fuzzing or other automated scanning features.

Other examples should be apparent from Appendix A and Appendix B.

Figure 4:
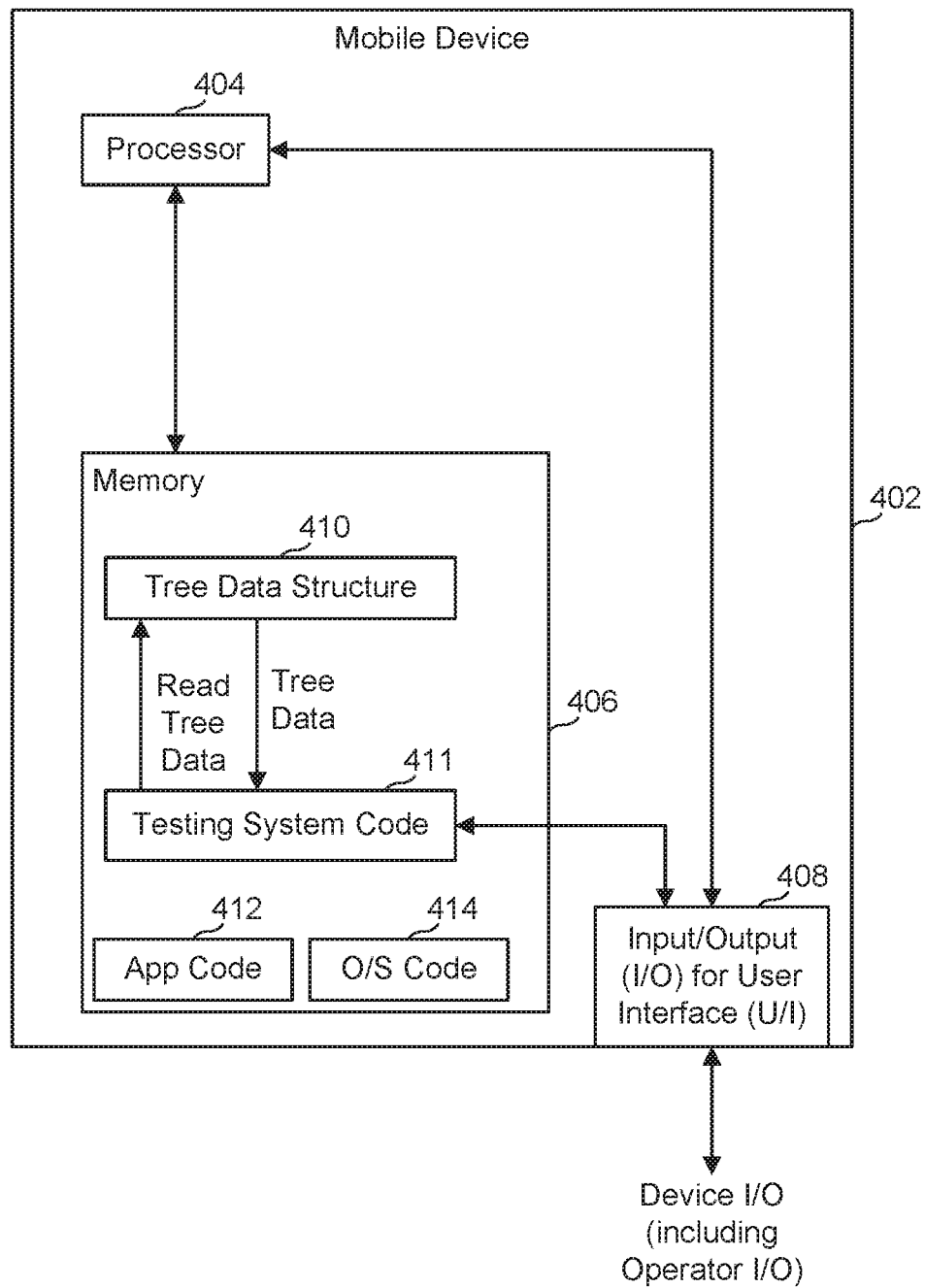
FIG. 4 is a block diagram of a mobile device capable of being tested where the testing system executes on the mobile device.

FIG. 4 is a block diagram of a mobile device capable of being tested where the testing system executes on the mobile device. As shown there, a mobile device 402 can include a processor 404, a memory 406, an I/O interface 408, with memory 406 including a tree data structure 410, testing system code 411, app code 412 and O/S code 414. Processor 404 can read and write from memory locations in memory 406, including reading instructions that processor 404 then executes. Examples of processor instructions that processor 404 can execute includes app code 412, testing system code 411, and O/S code 414. Memory 406 might comprise multiple different types of memory, the exact details of which are not essential to understanding this disclosure.

In a typical operation, mobile device 402 receives an input from a user (or a tester of the mobile device acting as a user would) while processor 404 is running O/S code 414. O/S code 414 includes instructions to load, upon the appropriate input such as a user pressing an icon, app code 412 and execute it and also to load testing system code 411 when initiated. Examples of O/S code include the iOS operating system and the Android operating system. As part of the loading of app code 412, the O/S builds a tree data structure, stored as tree data structure 410, corresponding to a user interface tree for the application. Testing system code 411 can include instructions for reading tree data structure 410 and getting operation input via I/O interface 408. Testing system code 411 can be executed to retrieve tree data without interfering with operation of the app itself.

Thus, in some embodiments, the testing system code executes separately while in others, it executes on the mobile device. That separate execution might be part of an embedded component of another system or perhaps executable as command lines in a command line interface. When embedded, the testing system might be used for fuzzing and automation as a method for vulnerability discovery against the user interface, since very low level UI selections and identifications can be provided without perturbing the app or requiring special builds of the app. An example might be a compiled app or a dynamic library that handles analyst queries. For example, the Cycript program might execute queries as needed and provide a debugging command line interface where the analyst can execute Objective-C functions and analyze the results.

Figure 5:
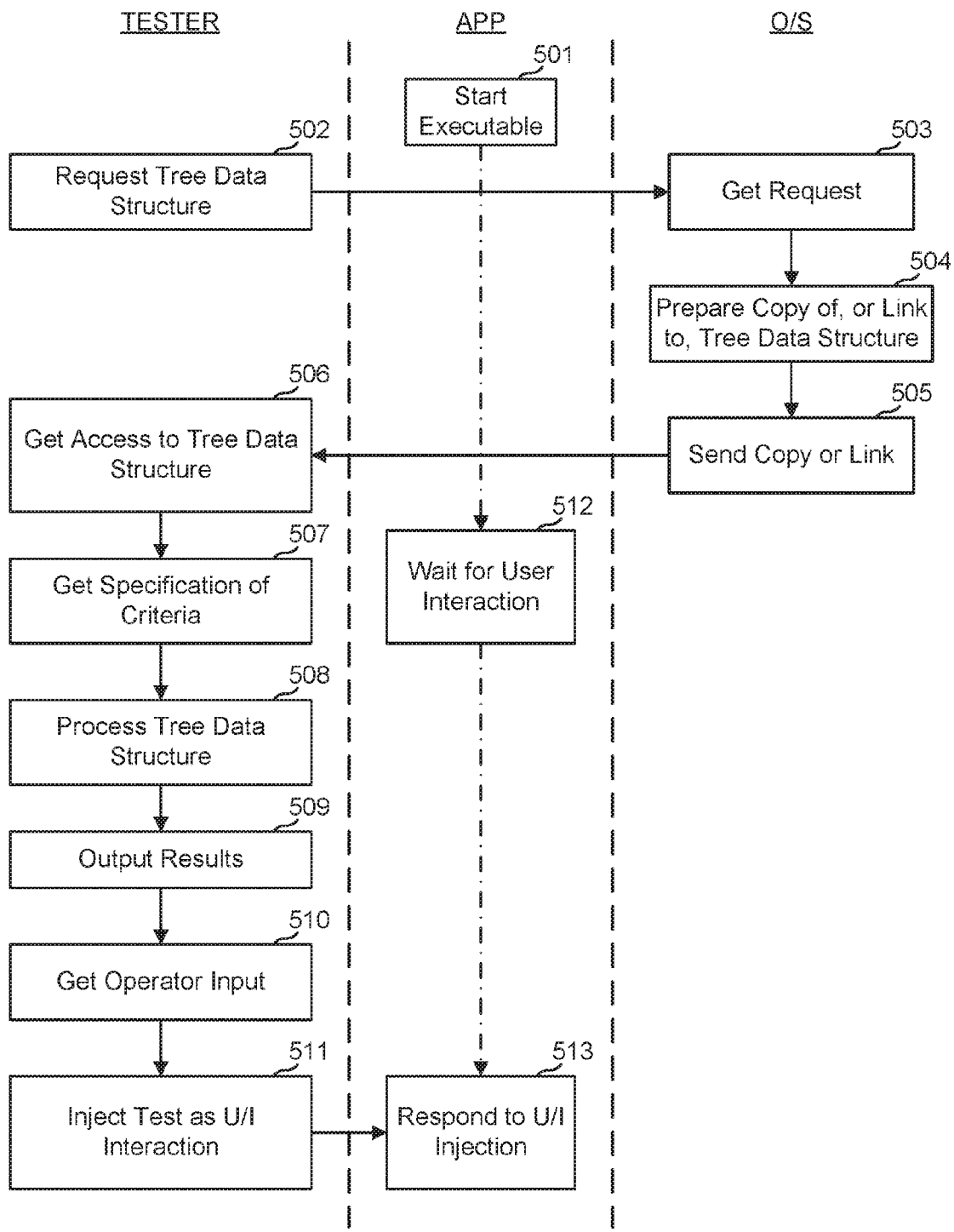
FIG. 5 is a swim diagram showing an example of a process for testing involving interaction between a tester using a testing system, an app running on a mobile device, and an operating system of that mobile device.

FIG. 5 is a swim diagram showing an example of a process for testing involving interaction between a tester using a testing system, an app running on a mobile device, and an operating system of that mobile device. In step 501, the app starts executing. As part of that process, a tree data structure is created in memory that the operating system uses to interact with the user of the mobile device. At step 502, the testing system makes a request to the operating system for the tree data structure. Since the app is running, the tree data structure is present in the memory of the mobile device. The operating system receives that request (step 503), prepares a copy of the tree data structure (step 504) and sends it (step 505) to the testing system. Where the testing system is also running on the mobile device, or as some other mechanism for accessing the memory, it might be sufficient for the operating system to send a link to the tree data structure.

Once the testing system has access to the tree data structure (step 506), the testing system can get from the tester a specification of a criteria (step 507), such as the examples shown herein elsewhere, processes the tree data structure (step 508) to find matches to the criteria (as explained herein elsewhere), outputs results (step 509), gets tester input (step 510) and injects a test as a user interface interaction (step 511) to the mobile app. Meanwhile, the app was waiting for user interaction (step 512) and responds to the user interface interaction that was injected by the testing system (step 513).

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 6:
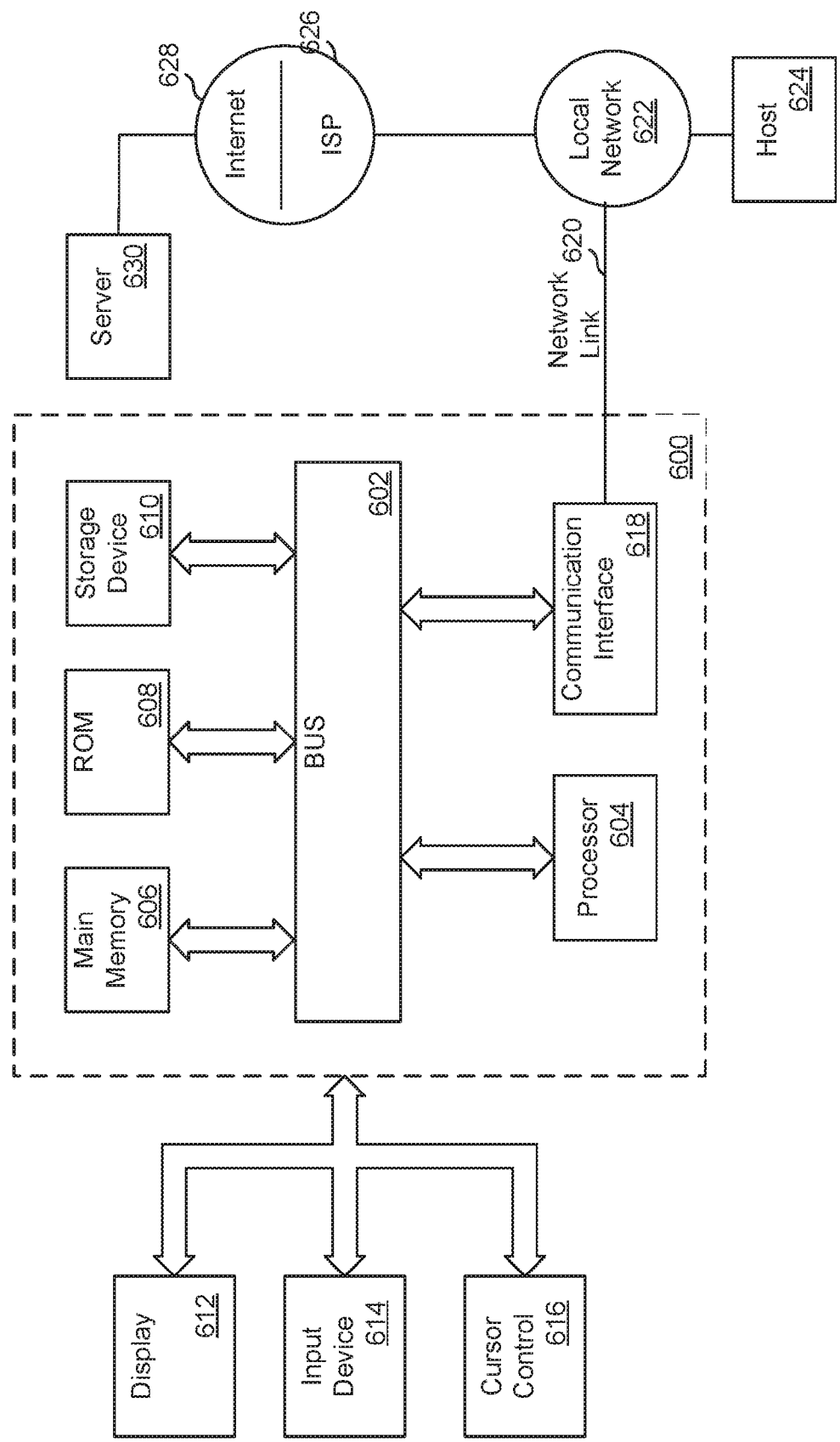
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, rearrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

APPENDIX A

Lexicon for Automated Vulnerability Discovery Language

```
%option outfile="out_uiquery_lex.m" header-file="out_uiquery_lex.h"
%option warn nodefault
%option reentrant noyywrap never-interactive nounistd
%option bison-bridge
OPEN_BRACKET        "["
CLOSE_BRACKET       "]"
OPEN_PAREN          "("
CLOSE_PAREN         ")"
COLON               ":"
COMMA               ","
OP_STR_CONTAINS     "*="
OP_STR_EQUALS       "=="
OP_STR_NOT_EQUALS   "!="
OP_STR_END_WITH     "$="
OP_STR_START_WITH   "^="
OP_EQUALS_TRUE      "?true"
OP_EQUALS_FALSE     "?false"
STRING_LITERAL      c?\'(\\.|[^\\'])*\'
IDENTIFIER          [_a-zA-Z0-9]+
WS                  [ \r\n\t]*
OTHER               .
%%
{OPEN_BRACKET}      { return TOKEN_OPEN_BRACKET; }
{CLOSE_BRACKET}     { return TOKEN_CLOSE_BRACKET; }
{OPEN_PAREN}        { return TOKEN_OPEN_PAREN; }
```

APPENDIX A-continued

Lexicon for Automated Vulnerability Discovery Language

```
{CLOSE_PAREN}          { return TOKEN_CLOSE_PAREN; }
{COLON}                { return TOKEN_COLON; }
{COMMA}                { return TOKEN_COMMA; }
{OP_STR_CONTAINS}      { return TOKEN_OP_STR_CONTAINS; }
{OP_STR_EQUALS}        { return TOKEN_OP_STR_EQUALS; }
{OP_STR_NOT_EQUALS}    { return TOKEN_OP_STR_NOT_EQUALS; }
{OP_STR_END_WITH}      { return TOKEN_OP_STR_END_WITH; }
{OP_STR_START_WITH}    { return TOKEN_OP_STR_START_WITH; }
{OP_EQUALS_TRUE}       { return TOKEN_OP_EQUALS_TRUE; }
{OP_EQUALS_FALSE}      { return TOKEN_OP_EQUALS_FALSE; }
{WS}                   { /* ignore */ }
{STRING_LITERAL}  {
    yylval -> sval = create_string_literal (yytext);
    return (STRING_LITERAL);
}
{IDENTIFIER}      {
        yylval->sval = create_identifier(yytext);
        return(IDENTIFIER);
}
```

APPENDIX B

Language Grammar for Automated Vulnerability Discovery

```
%pure-parser
%lex-param        { yyscan_t scanner }
%parse-param      { ast_node ** node }
%parse-param      { yyscan_t scanner }
%union {
void* sval;
};
%token TOKEN_OPEN_BRACKET
%token TOKEN_CLOSE_BRACKET
%token TOKEN_OPEN_PAREN
%token TOKEN_CLOSE_PAREN
%token TOKEN_COLON
%token TOKEN_COMMA
%token TOKEN_OP_STR_CONTAINS
%token TOKEN_OP_STR_EQUALS
%token TOKEN_OP_STR_NOT_EQUALS
%token TOKEN_OP_STR_END_WITH
%token TOKEN_OP_STR_START_WITH
%token TOKEN_OP_EQUALS_TRUE
%token TOKEN_OP_EQUALS_FALSE
%token <sval> STRING_LITERAL
%token <sval> IDENTIFIER
%type <sval> op_expression
%type <sval> expression
%type <sval> or_expression_list
%type <sval> expression_list
%type <sval> expr_modifier
%%
input
    : expression_list { *node = (__bridge_transfer ast_node*)$1; }
    ;
op_expression
  : TOKEN_OPEN_BRACKET IDENTIFIER TOKEN_OP_STR_CONTAINS STRING_LITERAL
      TOKEN_CLOSE_BRACKET { $$ = create_op_string_contains($2, $4); }
  | TOKEN_OPEN_BRACKET IDENTIFIER TOKEN_OP_STR_EQUALS STRING_LITERAL
      TOKEN_CLOSE_BRACKET { $$ = create_op_string_equals($2, $4); }
  | TOKEN_OPEN_BRACKET IDENTIFIER TOKEN_OP_STR_NOT_EQUALS STRING_LITERAL
      TOKEN_CLOSE_BRACKET { $$ = create_op_string_not_equals($2, $4); }
  | TOKEN_OPEN_BRACKET IDENTIFIER TOKEN_OP_STR_END_WITH STRING_LITERAL
      TOKEN_CLOSE_BRACKET { $$ = create_op_string_ends_with($2, $4); }
  | TOKEN_OPEN_BRACKET IDENTIFIER TOKEN_OP_STR_START_WITH STRING_LITERAL
      TOKEN_CLOSE_BRACKET { $$ = create_op_string_starts_with($2, $4); }
  | TOKEN_OPEN_BRACKET IDENTIFIER TOKEN_CLOSE_BRACKET {$$ =
      create_op_attr_exists($2); }
  | TOKEN_OPEN_BRACKET IDENTIFIER TOKEN_OP_EQUALS_TRUE
      TOKEN_CLOSE_BRACKET { $$ = create_op_equals_true($2); }
```

APPENDIX B-continued

Language Grammar for Automated Vulnerability Discovery

```
  | TOKEN_OPEN_BRACKET IDENTIFIER TOKEN_OP_EQUALS_FALSE
      TOKEN_CLOSE_BRACKET { $$ = create_op_equals_false($2); }
  ;
or_expression_list
  : TOKEN_OPEN_PAREN expression_list TOKEN_CLOSE_PAREN { $$ =
    create_or_expression_list($2); }
  ;
expr_modifier
  : TOKEN_COLON IDENTIFIER { $$ = create_modifier($2); }
  ;
expression
  : IDENTIFIER                    { $$ = create_expression($1);
  | op_expression                 { $$ = $1; }
  | or_expression_list            { $$ = $1; }
  | expr_modifier expression      { $$ = create_modified_expression($1, $2); }
  ;
expression_list
  :                               { $$ = create_expression_list( ); }
  | expression expression_list    { $$ = add_expression_list($1, $2) }
  ; % %
```

What is claimed is:

1. An automated testing method, for use in testing an application that is executable on a computing platform having a processor and memory, the method comprising:
   executing the application under test on the computing platform;
   accessing a tree data structure, the tree data structure being a data structure created on the computing platform for use in operation of the application, wherein the tree data structure corresponds to user interface components of the application used for user interface when the application is in use with a user of the application;
   obtaining a specification of user interface criteria of a testing analyst;
   processing the tree data structure with the specification to identify one or more matching nodes of the tree data structure that match the user interface criteria; and
   outputting a representation of the one or more matching nodes.

2. The automated testing method of claim 1, wherein accessing is accessing without modification of the application from a perspective of the user of the application.

3. The automated testing method of claim 1, wherein the one or more matching nodes are user interface entry points capable of being used to test the application for vulnerabilities.

4. The automated testing method of claim 1, wherein the specification includes at least one edge criterion, wherein an edge criterion corresponds to a characteristic of an edge in the tree data structure between at least two nodes of the tree data structure.

5. The automated testing method of claim 1, wherein the user interface criteria includes a type of user interface screen that is presented at a particular node in the tree data structure.

6. The automated testing method of claim 5, wherein the type of user interface screen is a login screen and the particular node corresponds to a state of the application at which the application would ask a user for login credentials.

7. The automated testing method of claim 1, wherein the tree data structure includes a main menu node having have multiple edges where which edge is taken depends on which menu item of a plurality of menu items the user would select using a user interface of the application.

8. The automated testing method of claim 1, wherein processing the tree data structure comprises navigating the tree data structure to determine where possible vulnerabilities might need to be tested for, the method further comprising:
   setting a state of the application to a particular node of the tree data structure; and
   performing a test of the application when in the state.

9. The automated testing method of claim 1, wherein the tree data structure is a data structure created by a graphical subsystem of the computing platform, the method further comprising:
   specifying a structured query over the tree data structure to locate nodes of interest in the tree data structure; and
   injecting user interface interactions as part of the testing of the application, thereby natively addressing components of the application that would be displayed to the user.

10. The automated testing method of claim 1, further comprising:
   querying the tree data structure to obtain one or more specific components of a user interface that match a criteria specified by an analyst, wherein the one or more specific components are based on existence of function values, field values, or return values of the one or more specific components; and
   walking the tree data structure using a depth-first search to check the one or more specific components for matching of the criteria.

11. The automated testing method of claim 1, wherein the user interface criteria includes a class name and/or an attribute that can be matched to a node of the tree data structure and that returns an indicator of existence of a node with the attribute or returns a value of a method call.

* * * * *